Patented Dec. 2, 1930

1,783,561

UNITED STATES PATENT OFFICE

KARL EISENMANN, OF LUDWIGSHAFEN-ON-THE-RHINE, AND FRIEDRICH BERGMANN, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF IMPROVED MAGNETIC CORES

No Drawing. Application filed March 18, 1929, Serial No. 348,125, and in Germany March 30, 1928.

The present invention relates to the production of improved magnetic cores.

Magnetic composition cores such as are used for Pupin coils, magnets and the like, can be produced from metallic powders by intimately mixing the same with an insulating material and then pressing the mixtures into the desired shape under heavy pressure.

We have now found that particularly favourable results as regards effective permeability are obtainable when such cores are made up with the aid of an insulating material which comprises a resinous condensation product of urea, or thiourea, or a derivative thereof, with formaldehyde. In the course of the last years numerous processes have been suggested for the production of such resinous condensation products, and any of these products may be used for the purposes of our present invention.

According to our invention, the cores or the like are produced by impregnating the metallic powder with a condensation product of the said kind, and subjecting the resulting mass to a high pressure, thereby bringing it into the desired shape. The impregnation of the metallic powder may be effected by mixing it with a powdery resinous condensation product of the said kind but we prefer to mix the metallic powder with a solution of the condensation product and to dry the resulting mass.

The metallic powder employed for the production of the cores is preferably made from a carbonyl of the corresponding metal, for example by thermal decomposition in such a manner that the carbonyl is mainly decomposed without coming into contact with hot walls or other parts of the decomposition vessel.

The following example will further illustrate the nature of the invention which however is not restricted thereto.

Example 4 kilograms of iron powder prepared by the thermal decomposition of iron carbonyl are mixed in a suitable kneading machine with 330 grams of an ethyl alcoholic solution (of 36 per cent strength) of a resinous condensation product of urea and formaldehyde obtainable by condensing dimethylol-urea in ethyl alcohol, which solution has been diluted with 800 grams of a mixture of equal parts by volume of ethyl alcohol and benzene. When intimate mixing has been attained, the whole of the solvent is driven off by heating to about 80° C. in vacuo. The iron powder impregnated in this manner is formed into rings under a pressure of 7000 kilograms per sq. cm., in a mould. A core constructed from three of such rings and provided with a single layer of winding, has the specific gravity 6.4 and a permeability of $\mu = 35.2$.

What we claim is:—

1. As new articles of manufacture, magnetic cores comprising a metallic powder having magnetic properties and a resinous condensation product of a urea and formaldehyde.

2. As new articles of manufacture, magnetic cores comprising iron powder and a resinous condensation product of a urea and formaldehyde.

3. As new articles of manufacture, magnetic cores comprising iron powder obtained from iron carbonyl and a resinous condensation product of a urea and formaldehyde.

In testimony whereof we have hereunto set our hands.

KARL EISENMANN.
FRIEDRICH BERGMANN.